US006418419B1

(12) United States Patent
Nieboer et al.

(10) Patent No.: US 6,418,419 B1
(45) Date of Patent: Jul. 9, 2002

(54) AUTOMATED SYSTEM FOR CONDITIONAL ORDER TRANSACTIONS IN SECURITIES OR OTHER ITEMS IN COMMERCE

(75) Inventors: Robert Scott Nieboer, Nashville; Pedro V. Balcarce, Antioch; Ivan N. Zhidov; Micah James Eldred, both of Nashville, all of TN (US)

(73) Assignee: 5th Market, Inc., Nashville, TN (US)

( * ) Notice: Subject to any disclaimer, the term of this patent is extended or adjusted under 35 U.S.C. 154(b) by 0 days.

(21) Appl. No.: 09/359,686

(22) Filed: Jul. 23, 1999

(51) Int. Cl.[7] ............................................. G06F 17/60

(52) U.S. Cl. ........................................................ 705/37

(58) Field of Search ............................................ 705/37

(56) References Cited

U.S. PATENT DOCUMENTS

| | | | | |
|---|---|---|---|---|
| 5,136,501 A | * | 8/1992 | Silverman et al. | 705/37 |
| 5,168,446 A | * | 12/1992 | Wiseman | 705/37 |
| 5,809,483 A | * | 9/1998 | Broka et al. | 705/37 |
| 5,873,071 A | * | 2/1999 | Ferstenberg et al. | 705/37 |
| 5,924,082 A | * | 7/1999 | Silverman et al. | 705/37 |
| 5,924,083 A | * | 7/1999 | Silverman et al. | 705/37 |
| 5,950,178 A | * | 9/1999 | Borgato | 705/37 |
| 5,963,923 A | * | 10/1999 | Garber | 705/37 |
| 5,999,918 A | * | 12/1999 | Williams et al. | 705/36 |
| 6,016,482 A | * | 1/2000 | Molinari et al. | 705/35 |
| 6,134,536 A | * | 10/2000 | Shepherd | 705/37 |

FOREIGN PATENT DOCUMENTS

| | | | |
|---|---|---|---|
| EP | 0 401 203 | * | 12/1990 |
| EP | 0 411 748 | * | 2/1991 |

OTHER PUBLICATIONS

Lee, Charles M.C.; "Market integration and price execution for NYSE–listed securities," Journal of Finance, v48, n3, p1009(30), Jul. 1993.*
Kull et al.; "The house of games," Computer Decisions, v20, n8, p43(11), Aug. 1988.*
"State Street BSE: State Street and the Boston Stock Exchange Announce Exclusive Agreement," Business Wire, BW1247, Aug. 19, 1998.*
Pirrong, Craig; "A trading primer," Regulation, Bell and Howell, v22n4, pp:24–25, ISSN: 0147–0590, pp. 24–25, 1999.*

* cited by examiner

Primary Examiner—Wynn Coggins
Assistant Examiner—Forest Thompson, Jr.

(57) ABSTRACT

An apparatus and method of automatically and anonymously buying and selling positions in fungible properties between subscribers. The specific embodiment described in the disclosure relates to the buying and selling of securities or contracts where the offer to purchase or sell the property may be conditioned upon factors such as the ability to purchase or sell other property or the actual purchase or sale of other property. Specifically, the system described includes methods by which the system will sort and display the information available on each order, methods by which the system will match buy and sell order and attempt to use other markets to effect the execution of transactions without violating conditions set by the subscriber, methods by which the apparatus will execute transaction and report prices to third parties such that the user is satisfied and short sales are reported as prescribed by the rules and regulations of the appropriate regulatory body governing each subscriber in the associated transaction. A communication system is described which allows subscribers to communicate anonymously for the purpose of effecting transactions in such property under such conditions.

43 Claims, 10 Drawing Sheets

FIG. 4

```
09.25 [LODG.RA].B 200M 103 1/4 v 22 1/4... [LODG.RA].B 200M 103 1/4 v 22 1/4... [LODG.RA].S 200M 103 1/4 v 22 1/4...
09.26 [LODG.RA].B 200M 103 1/4 v 22 1/4... [SPLS.AA].S 200M 113 1/4 v 22 1/4... [LODG.RA].B 200M 103 1/4 v 22 1/4...
09.27 [LODG.RA].B 200M 103 1/4 v 22 1/4... [LODG.RA].B 200M 103 1/4 v 22 1/4... [LODG.RA].S 200M 103 1/4 v 22 1/4...
09.31 [FSFC/CAFC].B 5,000 14.95 v 16^7... [JBNK/WB].B 20,000 $1.06 DISC..... [SPLS.AA].S 200M 115 1/4 v 23 3/4
```
                                                          WHITE

```
SYM   [LODG.RA]   SCHOLODGE 7.5 %5/15/04   REGISTERED   95678AA3   LODG   RATIO = 42.942
```
  TAN            YELLOW                                                  MARKET PROPRIETARY TICKER

FIG. 6

```
LODG   LT   19 3/4 + 3/4 19 3/4-20  10x10
LODG.RA LT  103 1/2 + 1/4 103-104 1/2 14x45
```

FIG. 7

|      |   |       | %     | 000'S |         |
|------|---|-------|-------|-------|---------|
| 8/21 | X |       | 2,500 | 300   | 104.35  |
| 8/21 | X |       | 2,500 | 300   | 104.35  |
| 09.25| T |       | 4,000 | 500   | 103.875 |
|      |   | %200  |       | 45    | 104.35  |
|      |   |       | 1,200 | 200   | 104.35  |
|      |   |       |       | 75    | 103.25  |
| 09.25| T |       | 1,600 | 250   | 103     |
| 8/21 | X |       | 4,000 | 500   | 103.875 |
| 8/21 | X |       | 2,200 | 300   | 102.35  |
|      |   |       | 2,200 | 300   | 102.35  |

YELLOW
VS 19 7/8

FIG. 8

QUICK ORDER ENTRY / TRADE REPORTS

SOFT KEYS FOR WILD CARD AREA DISPLAY

MARKET MONITOR

THE ORDER BOOK AT 3:22 MAY LOOK LIKE:
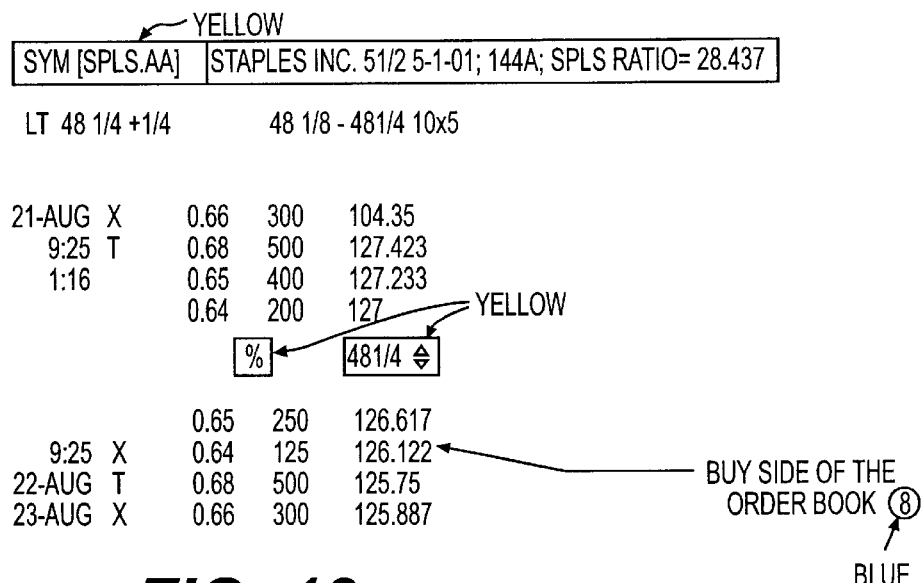
FIG. 13
ORDER BOOK SAMPLE
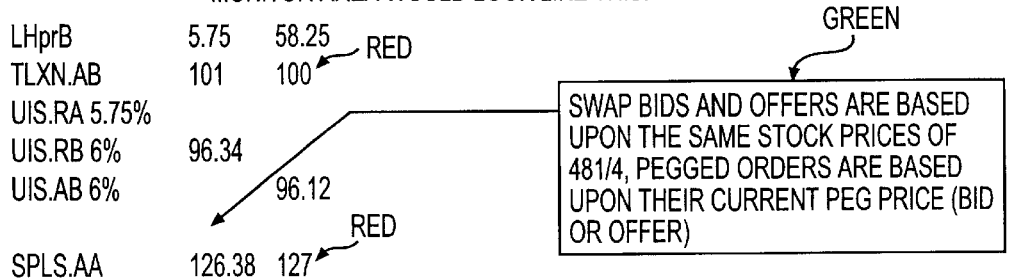
FIG. 14   MARKET MONITOR SPREAD OPTION

CONDITIONAL ORDER CHARTS

AUTOMATED SYSTEM FOR CONDITIONAL ORDER TRANSACTIONS IN SECURITIES OR OTHER ITEMS IN COMMERCE

BACKGROUND OF THE INVENTION

The present invention relates to a system and method for the conditional trading of arbitrary items over one or more electronic networks. More specifically, the present invention relates, in a preferred embodiment, to a method and system for contingency trading of securities such as convertible bond "swaps", risk arbitrage, and pairs in both listed and over-the-counter markets.

There are five types of industry participants generally involved in convertible securities: 1) mutual funds which make decisions to purchase and sell convertibles based upon a) fundamental research relating to the company or the industry, and b) asset allocation and portfolio adjustment decisions; 2) hedge funds which are driven to purchase and sell securities based upon the relative value of the convertible to its underlying stock and other convertibles; 3) large multinational broker-dealers which purchase and sell securities based upon customers' (mutual funds and hedge funds) purchase and sale interest as well as relative value; 4) regional broker-dealers which are driven to purchase and sell securities based upon customers' interest and retail distribution power; and 5) broker's brokers which expose indications of interest between dealers and some hedge funds, who act only as agent and do not position securities. There is no computer network actively linking these participants in a transaction-oriented format. Virtually every transaction is through verbal private negotiations. Almost every bid, offer or trade is made verbally and is transmitted only to those persons involved in the trade. The present invention will create an auction market instead of a negotiated market and will display prices to all participants and save the information for later use. The present invention is an anonymous system; the current verbal network is neither efficient nor anonymous.

Over the past 15 years electronic order display networks have proliferated in the equity markets. From Nasdaq's ACES system to the very successful Instinet system, the industry has been transformed from a marketplace in which negotiations take place over the phone between two parties to one in which negotiations take place over a computer network among several parties. This phenomena has created a quasi-negotiated/quasi-auction market in both Nasdaq securities which have, until recently, been primarily negotiation-based and listed security which have been primarily auction-based. In effect, these networks have provided users with the ability to choose the method of negotiation most befitting their current situation and objectives. Convertible securities markets have not been exploited by these systems to the extent the equity market has, in part because of the complex nature of "typical" trading practice. Specifically, a large portion of convertible securities presently held in positions are hedged in one form or another and well over 60% of the trading volume is effected with a "contingent" transaction (a transaction in which another security is traded at about the same time). The present invention has developed the framework for a system that satisfies a need in the art, which will exploit this market, and other contingency based markets like risk arbitrage, ADR's, pairs, and eventually, options.

SUMMARY OF THE INVENTION

Accordingly, a primary object of the present invention is to efficiently transact conditional buy and sell orders for items of commerce by multiple traders in real-time.

It is further an object of the present invention to match or negotiate conditional buy and sell orders of the items with reduced transaction costs to the traders.

It is another object of the present invention to rapidly process conditional buy and sell orders of securities such as, convertible bond "swaps", risk arbitrage, and pairs in both listed and over-the-counter markets.

It is still another object of the present invention to provide matching or comparing in accordance with constraints and conditions, algorithmic buy/sell orders with non-algorithmic sell/buy orders through the use of data from, and interaction with, multiple external exchanges.

It is yet another object of the present invention to provide traders improved workstations for entering, viewing, monitoring and changing or deleting conditional buy/sell orders, which reflects changes in the favorability of the orders.

It is still a further object of the present invention to give public access to the persons skilled in security transactions for trading of conditional securities in real-time without the assistance of traditional broker networks.

The objects of the present invention are fulfilled by providing a conditional order transaction network that matches or compares buy and sell orders for a plurality of items based upon conditions set forth within the order, including the price represented as an algorithm with constraints thereon, the conditional order transaction network comprising:

a variable number of trader terminals for entering an order for an item in the form of an algorithm with constraints thereon that represent a willingness to transact, where the price is the dependent variable of the algorithm within the constraints and the price of another item as an independent variable, the algorithm representing a buy or sell order; and at least one computer coupled to each of the trader terminals over a communication network and receiving as inputs,
a) each algorithm with its corresponding constraints and
b) at least one depicting prices of various items and contracts from external multiple data sources which may be used as variables of the algorithm or an input to a constraint variable, the controller computer comprising,
means for matching or comparing, in accordance with the constraints and conditions, algorithmic buy/sell orders with non-algorithmic sell/buy orders through the use of the external multiple data sources.

In a preferred embodiment, the items are security instruments such as stocks, bonds, options, futures, forward contracts or swap contracts. However, in the broader sense the system and method of the present invention is a conditional trading network for various commodities or items in commerce, including but not limited to cars, airline tickets, energy credits, petroleum products or gaming contracts. The items may be bought or sold outright or may be exchanged for a combination of other items and cash. The number of items and the amount of cash that exchanges hands is determined programmatically in accordance with predefined constraints specified when orders are made and as a product of data originating outside of the system, i.e., external data sources, and provided to it by external agents.

The invention is directed to an automated system for providing financial information, including trading information regarding securities, and conditional order transactional services in real-time to all users. Both are provided via a global computer network. This has the advantages of increasing the efficiencies in the marketplace, substantially reducing transaction costs, and providing equal opportunities to all users.

Subscribers/traders to the network are provided with ongoing financial information. A subscriber can choose certain securities for which he is to be apprised of any relevant activity.

A subscriber can submit a conditional offer to buy/sell. This conditional buy/sell offer is immediately conveyed to all subscribers i.e., there is instant exposure to the market. Other subscribers can accept or counter the offer, with the acceptance or the counter offer being communicated immediately to the original offeror and/or the other subscribers to the system.

The system facilitates contingent or conditional trading. It provides real-time market data and communication links between subscribers. It makes possible the monitoring of securities of various types, the receiving of market data, the entering and executing of orders in an order book, the negotiating of trades against other "orders" in the book and the routing of the orders to various exchanges such as the New York Stock Exchange (NYSE), Nasdaq, American Stock Exchange (AMEX) and the Pacific Stock Exchange (PSE) through such access providers as DOT, ITS or Select-Net. In addition, subscribers to the system may automatically received confirmations of trade executions, access static data from the financial information database and analyze securities for potential trades using such data and real-time prices.

The system is preferably anonymous. However, a subscriber can monitor the total number of subscribers currently viewing a particular security.

Each subscriber can view the order book in different ways or input orders to the system using screen or form views which are intuitively different but logically identical, i.e., which present the same substance in different formats. For instance, instead of formatting an offer to purchase an option at a specific price as originally input by a subscriber, another subscriber can customize his network interface to automatically convert the format and display the offer in the form of a volatility offering.

As another example, a first subscriber can make a conditional offer in the format of an offering to purchase security A and sell security B at set prices. A second subscriber may customize his network interface to automatically translate all such conditional offers into a discount amount, i.e., A*ratio–B– discount. The second subscriber might counter offer in his preferred discount format, but the first subscriber can customize his network interface to automatically translate all such conditional offers into his preferred format of "sell A versus buy B at different level."

The objects of the present invention are further fulfilled by providing a trader workstation for trading and negotiating prospective trades for instruments referenced in buy and sell orders, based upon conditions set forth in the orders including the price represented by an algorithm with constraints thereon, comprising;

a display device for displaying the selected parameters of buy and sell orders in a prioritized sequence in a descending order of favorability across a display field, with the most favorable order at one distal end and the least favorable at the other distal end;

an input device for entering outgoing orders to be traded or negotiated into the trader workstation; and a computer for receiving the outgoing orders and incoming order information from traders' terminals, and for controlling the display device, said computer including, a comparator for comparing all incoming orders relative to outgoing orders, and a sorter that resequences the orders in real-time in the display field as each order is received to reflect changes in the relative favorability of the orders.

The system monitors existing bids/offers for changes in the secondary securities that would cause bids/offers to intersect. The system can automatically execute (i.e., place orders on the secondary security and report the transaction in the primary security) bids/offers when they intersect. To place an order for the secondary security, the system can automatically contact the appropriate exchange (e.g., NYSE) to place the bid/offer for the secondary security.

Further scope of the applicability of the present invention will become apparent from the detailed description given hereinafter. However, it should be understood that the detailed description and specific examples, while indicating preferred embodiment of the invention, are given by way of illustration only, since various changes and modification within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is an illustration of a display screen at a trader/subscriber/user terminal for use in the system of the present invention depicting various display fields;

FIG. 5 is an illustration of the ticker display field portion of the display screen of FIG. 4;

FIG. 6 is an illustration of the security description line on the display screen of FIG. 4;

FIG. 7 is a display field of the active external market data on the display screen of FIG. 4;

FIG. 8 is the order book display field portion of the display screen of FIG. 4;

FIGS. 13 and 14, respectively, are portions of the order book displaying the data of FIG. 12 in two respective options, namely, a regular option in FIG. 13, and a spread option in FIG. 14;

DETAILED DESCRIPTION OF THE PREFERRED EMBODIMENTS

Figure 1:
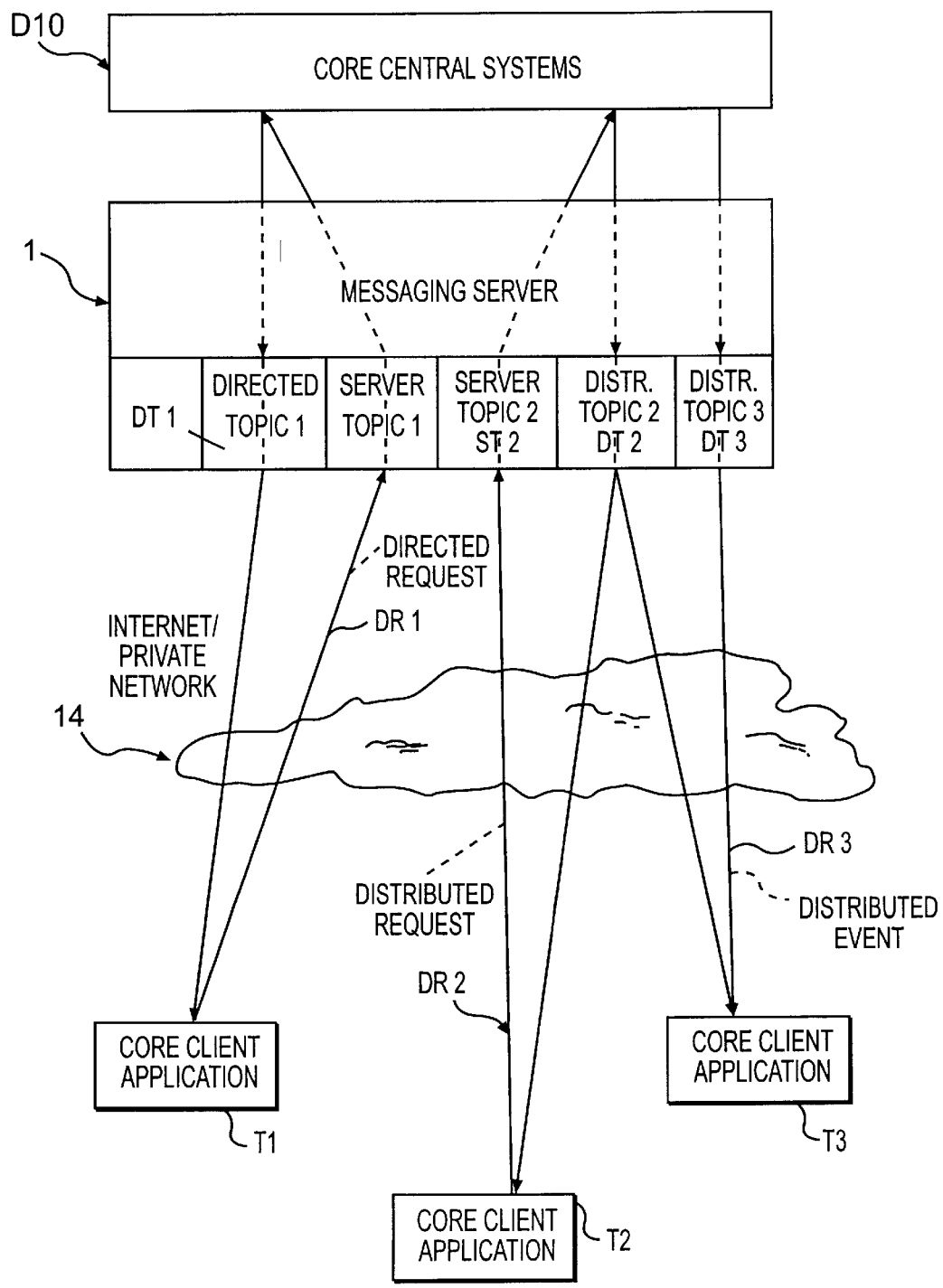
FIG. 1 is a diagrammatic illustration of a conditional order transaction system in accordance with the present invention providing an overview of system operation.

Referring to FIG. 1, there are three scenarios depicted for use of the conditional order routing exchange (hereinafter CORE) of the present invention. The first scenario depicts a client/subscriber/trader request with a directed response. The second shows a client request whose response is disseminated to various interested parties. The third represents data originating outside of the system and distributed to all interested parties.

Directed Response

The CORE client program T1 formats and transmits a message for the system to handle DR1, expecting whatever response is appropriate to be directed only to the initiating program. The message is transmitted via the internet or some virtual network 14 through a messaging server 12, an application charged with delivering messages from one sender to one or more recipients, guaranteeing the delivery of the message, integrity of its contents, and the preservation of the order in which the orders were sent. The message is delivered to the system through a server topic ST1, a messaging server mechanism configured to allow messages to be retrieved by the system exactly once. A collection of server-side application designed to cooperate in the present invention's centralized data processing, i.e. CORE Central Systems 10, a messaging server mechanism configured to allow message to be retrieved by a client exactly once.

Distributed Response

The CORE client program T2 formats and transmits a message for the system to handle DR2, expecting whatever response is appropriate to be distributed to every client program that has expressed interest in this information. The message is transmitted via the Internet or some virtual network 14 through the messaging server 12. The message is delivered to the system through a server topic ST2, guaranteeing it will be processed exactly once. The CORE Central Systems 10 process the client request and distribute any appropriate data through a distributed topic DT2 to any clients that have expressed interest in this data T3, including the originating program T2.

Distributed Event

The CORE Central Systems 10 receive data, from some external source, that needs to be redistributed internally. The system formats and transmits a message, including the external data, through a distributed topic DT3 to any clients that have expressed interest in this data T3. The message DR3 is delivered from the system through the messaging server 12 via the Internet or some virtual network 14.

Figure 2:
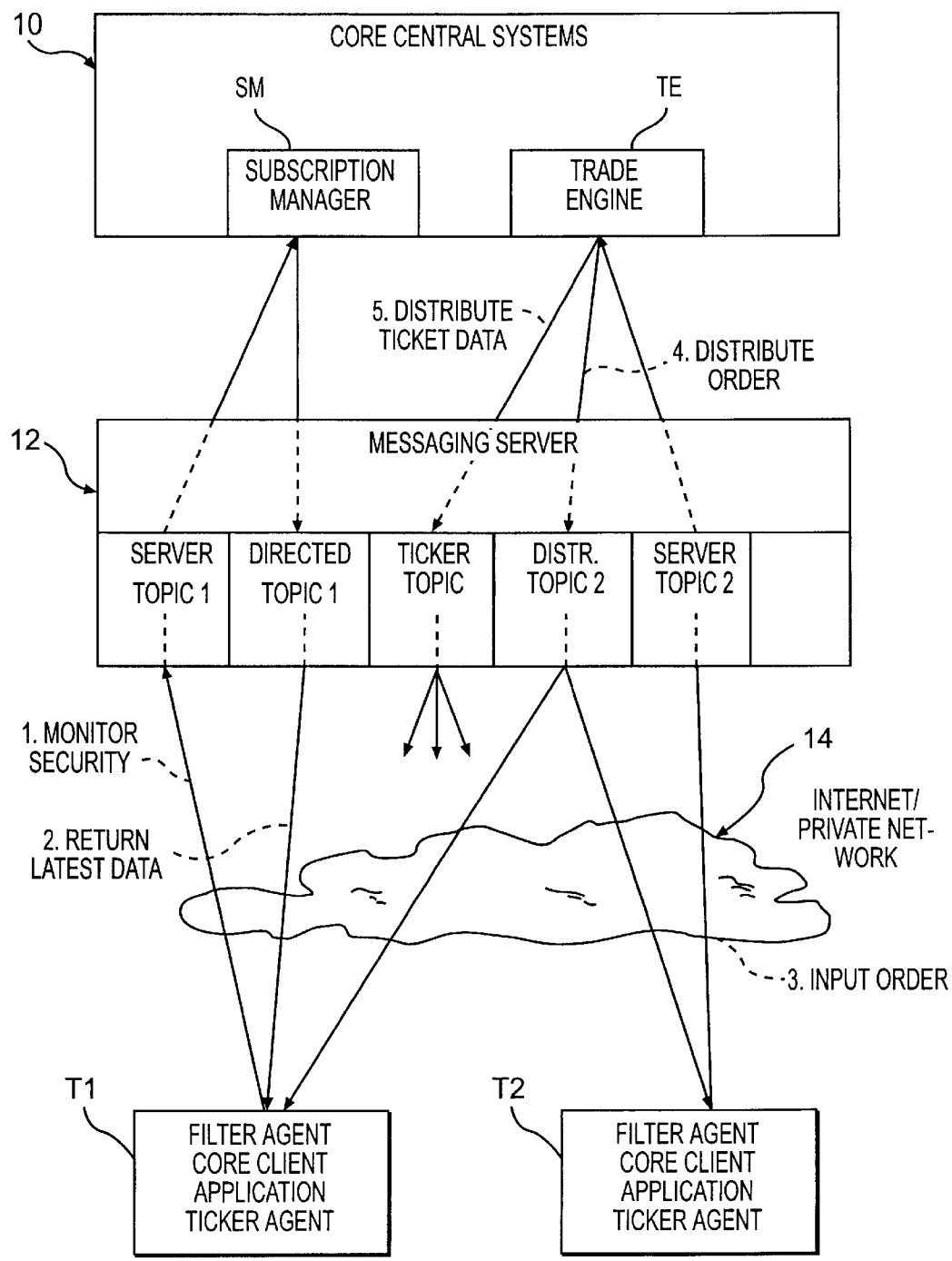
FIG. 2 is a schematic block diagram of the system of FIG. 1 illustrating an example of the processing of an input order to the system.

FIG. 2 illustrates the placing an order in the system of the present invention. This scenario depicts a situation where one client has requested to be informed on events related to a given security sometime before a second client places an order for that security.

An overview of the steps is as follows:

1. Monitor Security
2. Return Latest Data
3. Input Order
4. Distribute Order
5. Distribute Ticker Data Monitor Security The CORE client program T1 formats and transmits a message for the system to handle, requesting to be kept informed on changes concerning a certain security. The client expects whatever response is appropriate to be directed only to the initiating program. The message is transmitted via the Internet or some virtual network 14 trough a messaging server 12. The message is delivered to the system through a server topic, guaranteeing that is will be processed exactly once. A server-side component charged with tracking the expressed interests of client applications SM2 received the message and makes the proper changes to its subscription lists.

Place an Order

At some later time, a CORE client program T2 formats and transmits a message for the system to place a new order for the security in question. The client expects a positive response to be directed to all interested parties interacting with the system. The message is transmitted via the Internet or some virtual network 14 through a messaging server 12. The message is delivered to the system through a server topic, guaranteeing that is will be processed exactly once. A server-side component charged with routing and matching orders TE receives the message and makes the proper changes to its active orders lists. Details of the new order are then transmitted to any registered interested party T1 and T2 via the appropriate distributed topic. Order details relevant to the ticker (which is potentially run on every client) is transmitted through a special distribution topic, the ticker topic, which is configured to be read once by every client that has registered as a party interested in this information.

Figure 3:
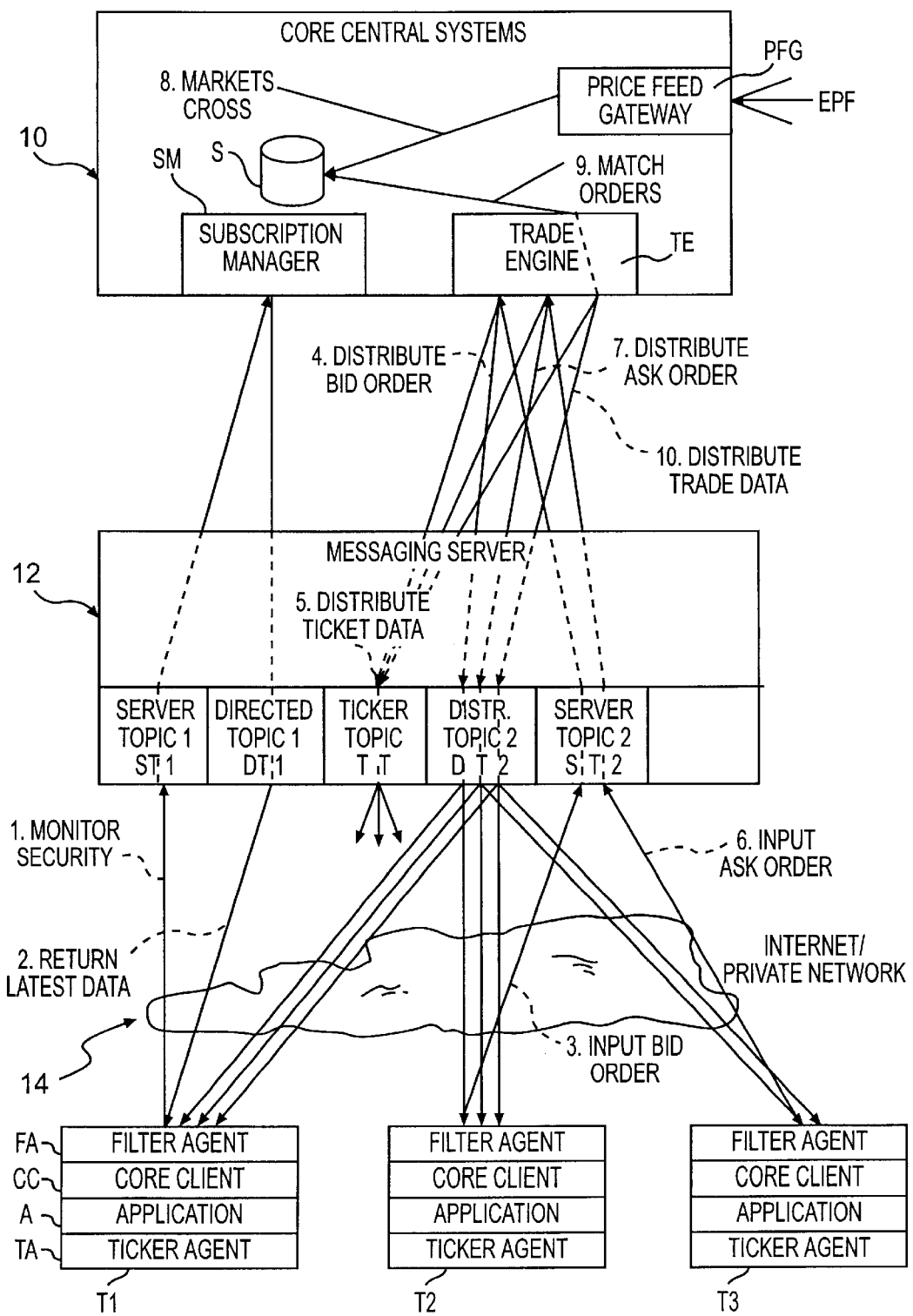
FIG. 3 is a schematic illustration of the operation of the system in connection with a match order.

FIG. 3 illustrates the processing of a match order using the system of FIG. 1. This scenario depicts a situation where one client has requested to be informed on events related to a given security sometime, then a second client places a bid for that security, then a third client places an ask for that same security.

An overview of the processing step are numbered in FIG. 2 as follows:

1. Monitor Security
2. Return Latest Data
3. Input Bid Order
4. Distribute Bid Order
5. Distribute Ticker Data
6. Input Ask Order
7. Distribute Ask Order (also Distribute Ticker Data
8. External prices converge making orders cross
9. Crossed orders are matched
10. Distribute Trade Detail Monitor Security The CORE client program T1 formats and transmits a message for the system to handle, requesting to be kept informed on changes concerning a certain security. The client expects whatever response is appropriate to be directed only to the initiating program. The message is transmitted via the Internet or some virtual network 14 through a messaging server 12. The message is delivered to the system through a server topic ST1, guaranteeing that it will be processed exactly once. A server-side component charged with tracking the expressed interests of client applications SM2 receives the message and makes the proper changes to its subscription lists. The subscription manager also ensures that any current information on the interesting security is formatted and transmitted directly to the initiating program via a directed topic DT1.

Place a Bid Order

At some later time, a CORE client program T2 formats and transmits a message for the system to place a new bid order for the security in question. The client expects a positive response to be directed to all interested parties interaction with the system. The message is transmitted via the Internet or some virtual network 14 through a messaging server 12. The message is delivered to the system through a server topic ST2, guaranteeing that it will be processed exactly once. A server-side component charged with routing and matching orders TE receives the message and makes the proper changes to its active orders lists. Details of the new order are then transmitted to any registered interested party T1,T2 via the appropriate distributed topic.

Order details relevant to the ticker (which is potentially run on every client) is transmitted through a special distribution topic, the ticker topic, which is configured to be read once by the ticker agent TA of ever client that has registered as a party interested in this information.

Place an Ask Order

At some later time, a CORE client program T3 formats and transmits a message for the system to place a new ask order for the security in question. The client expects a positive response to be directed to all interested parties interacting with the system. The message is transmitted via the Internet or some virtual network 14 through a messaging server 12. The message is delivered to the system through a server topic ST2, guaranteeing that it will be processed exactly once. A server-side component charged with routing and matching orders TE receives the message and makes the proper changes to its active orders lists. Details of the new order are then transmitted to any registered interested party T1, T2 and T3 via the appropriate distributed topic.

FIGS. 4 to 14 illustrate features of a client/subscriber/trader display screen using the system of FIG. 1. The network is designed to increase the price transparency of these types of transactions among the users of the system. To accomplish this, the system provides real-time market data and communication links between hedge funds, institutions, professional money managers, exchange specialists, Nasdaq market-makers, and international banks and broker-dealers.

A variety of trading related functions is provided to trader/subscribers. These functions include: monitoring securities of various types, receiving market data, entering and executing orders on the proprietary order book, negotiating trades against other orders in the book, and routing orders to various exchanges such as the NYSE, Nasdaq, AMEX and the PSE through DOT, ITS or SelectNet. In addition, subscribers may automatically receive and monitor confirmations of trade executions, access static data from the system database and analyze securities or potential trades using that data and real-time prices.

Figure 4:
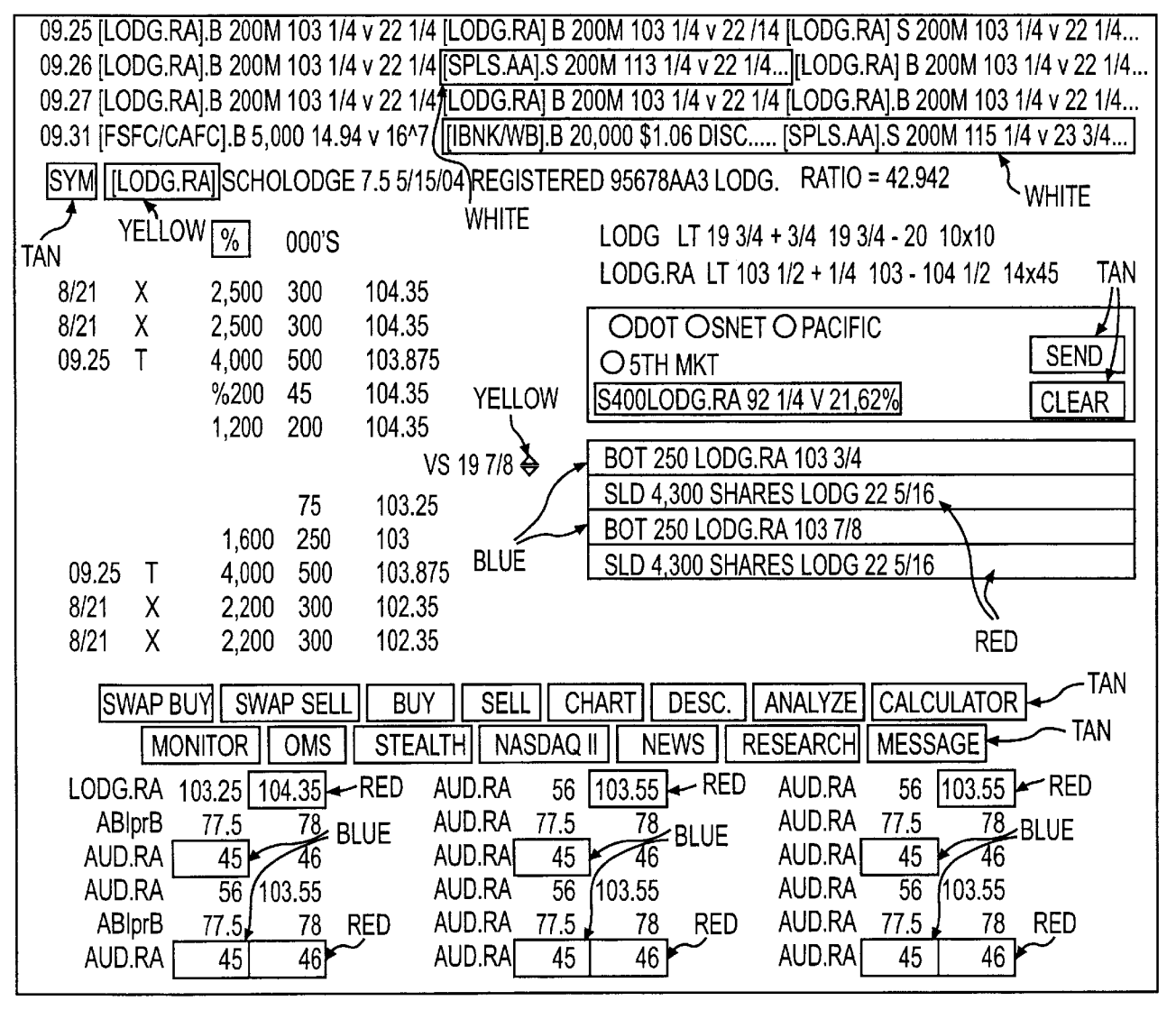

The functions available to the user include the following:
1) A ticker tape with unique features and form;
2) A specially designed order book including:
   a) Order routing into the book
   b) Order routing to NYSE/AMEX via DOT
   c) Order routing to Nasdaq via SelectNet
   d) ITS linked order routing through the PSE
   e) Trade Report Monitor
   f) Viewing the book sorted by prices
3) Wild Card Workspace including:
   a) Security Market Monitor
   b) Nasdaq Level II
   c) Basket Order Entry/Order Management
   d) Graphic representation of past orders or trades on the book
   e) Database, Research, and Analysis
   f) Administrative Messaging FIG. 4 depicts the display screen 100 of a subscriber/trader terminal.

FIGS. 5 to 14 depict the separate component sections of the display screen of FIG. 4.

FIG. 5—The Ticker Section

The ticker tape 102 allows users to view information within the system in a consistent and intuitive manner. Initially, the information displayed will include all bids and offers which are entered into the CORE system Order Book as well as all trades which occur on the system. These bids, offers and trades will include the following data elements relative to each: Security identification symbol; whether the order is a bid, an offer, or a trade; quantity; and price versus its related security price. As an example, a customer entering an order to Buy 250M Staples 5% Mar. 1, 2005, 144a bonds at a price of 114¼ conditioned upon selling 2000 shares of Staples common stock short at 22½ would be displayed on the Ticker as ". . . [SPLS.AB].B 250M 114¼ v 22½ . . . ". A sell order would be represented by the letter "S" after the symbol, and a trade would be represented by a "T". The relationship of the order to the user will invoke a color-coding scheme on the user's terminal. For example, if a user has an active order on the book in a security and someone puts either a competing or opposite order on the book, the new order will be displayed on the Ticker with a white background and either a blue or red foreground depending upon its direction (buy or sell). Other highlights like color, flash, and or special symbols will be used sparingly.

Symbols follow a couple of simple rules. Generally the common stock symbol used in its primary exchange is the first section before a dot (.), then either an R, A, S, E, or pr, pa, ps, pe. The "R" means the security has been registered, "A" means the security has a 144*a* status, "S" means regulation "S" status, "E" means eurobond, and pr means the security is a preferred stock. Generally, if a security derives its value from the price of the common stock in the symbol, the security symbol alone is used in the ticker, however, a more generalized symbol would be [APEprA/NB], or [LYX/LYO] where the first security is the security which derives its value in part from the value of the second security. This convention will be useful when the systems are developed for risk arbitrage, pairs, baskets, ADRs, or options.

The Ticker does not capture all of the information available. It displays only enough information for a user to screen for important bids, offers, and trades. A user can attain all available information behind the Ticker by selecting that symbol for the Order Book, or by clicking the ticker item which will have the same effect. If "[LODG.RA]. B 200M 103^2 v 22a7" is used as an example, clicking on the "[LODG.RA]" will pull up the 5thMarket Convertible Order Book for [LODG.RA]; clicking on the ".B" will bring up both the Convertible Order Book for [LODG.RA] and a "Negotiation They Buy/We Sell Ticket" with the Symbol defaulted to [LODG.RA]; clicking on "200M" will bring up the Order Book, a "Negotiation They Buy/We Sell Ticket", and will place the Symbol and "200M" in the order form and lastly; clicking on 103^2 will bring up all of the above plus fill in the Buy Order Form with all of the information needed to execute the trade, defaulted to the buyers "buy parameters" and calculated on a dollar neutral basis to the current stock price. This may seem complex but intuitively, clicking on the symbol means you want to see that security, clicking on the .B or .S means you want to Buy or Sell, clicking on the volume means you want to buy or sell that volume, and clicking on the price means you want to buy or sell that volume at that price.

The following are examples of different types of Tickers and what they an, they correspond to examples of orders displayed in the Order Book:

| | | |
|---|---|---|
| 1 | [LODG.RA].B 100M 102^7 | Sholodge; Registered; 7½% 5/15/03; Buyer; $100,000 face amount; Price = 102⅞; not conditional upon the price of any other security. |
| 2 | [LODG.RA].S 100M 103^7 v 22^2 | Sholodge; Registered; 7½% 5/15/03; Seller; $100,000 face amount; Price = 103⅞; Sale conditioned upon purchasing the common stock of Sholodge at 22¼. |
| 3 | [LODG.RA].B 100M 102 p 21^4 | Sholodge; Registered; 7½% 5/15/03; Buyer; $100,000 face amount; Price = 102; Purchase conditioned upon the bid in the primary market being 21½(read: pegged to the bid) no stock will trade concurrently with the execution of this buy order. |
| 4 | [LODG.RA].T 95M 103.27 v 23^1 | Sholodge; Registered; 7½% 5/15/03; Trade; $95,000 face amount; Price = 103.27XX; Traded simultaneously with the common stock of Sholodge at 23^1. |
| 5 | [SPLS.AA].B 250M 114.25 vs 22.5 | This is the general format for a ticker item, white on black, followed by several dots . . . . , not bold. |
| 6 | [JBNK/WB].B 20,000 $1.06 disc. . . . | This format is one which occurs when the current user has an active order in [JBNK/WB] and a buy order is placed on the book. (blue on white) |
| 7 | [SPLS.AA].S 200M 115 1/4v 23 3/4 . . . | This format is one which occurs when the current user has an active order in [SPLS.AA] and a sell order is placed on the book. (red on white) |
| 8 | [RXT.SA].S 500M 113 v 21^2 | Renal Treatment Seller of 500,000 face of the Reg. S bond at 113 versus buying stock at 21¼ |
| 9 | [AAPL].B 3000 22^2 | Apple Computer common stock buyer. |
| 10 | [LYX/LYO].S 5000 34^1 v 22^2 | Seller of LYX versus buying LYO (generalized form) |
| 11 | [JBNK/WB].B 5000 1.06d | Risk arb. discount nomenclature. Client transforms generalized form into discount nomenclature before displaying. |
| 12 | [JBNK/WB].S 4500 .95d ☎ | Same as above, but the offer was made over the phone and is now subject. |
| 13 | [FSFC/CAFC].S 5000 14^2 v 15a1 | Risk arb. usual format, |
| 14 | Flashing Ticker Items | When an offering is made at or lower than the last trade, it should blink 5 times, and when a bid is made at or higher than the last trade, it should blink 5 times. |

FIG. 6—Security Description Line

The system provides users with one line 104 of static descriptive information about the security which is being monitored on the Trade Book. This data includes: security symbol, name of issuer, coupon information, maturity information, registration type (registered, 144a, regulation S, etc.), cusip or other security identifier, symbol of the underlying security, and conversion ratio. This information is displayed to insure that the user is monitoring or trading the correct security.

| Description | Function |
|---|---|
| ❶ Softkey for symbol entry | pulls down options: Input; Directory; Symbol Description |
| ❷ System Symbol of the security currently being monitored on the order book | main identifier for system |
| ❸ Name of Issuer | from static database |
| ❹ Coupon/Dividend of Security | from static database |
| ❺ Maturity Date of Security if applicable | from static database |
| ❻ Registered/144a/Reg S/Euro trache of Security | from static database |
| ❼ Cusip or other identifier | from static database |
| ❽ Symbol of Related (underlying) security | from static database |
| ❾ Conversion Ratio of security | from static database (daily update/check) |

FIG. 7—Active Market Data

Users are provided with external pricing of securities that are being quoted on the Order Book. The following pricing information is provided on both the security presently on the Order Book and its underlying security.

Description

① Last Trade of Security on its primary exchange (NYSE, AMEX, Nasdaq) and difference from previous days close.
② Current Bid and Offer of the security on its primary exchange
③ Size of the bid and offer of the security on its primary market
④ The number of Subscribers currently monitoring that particular security
⑤ The last trade of the related security on its primary exchange and its difference from the previous days close
⑥ The current bid and offer of the related security on its primary exchange
⑦ The size of the bid and offer of the related security on its primary exchange sized to convention
⑧

FIG. 8—Order Book

The Order Book allows users to present bids or offers to, negotiate with, or trade with other users of the system. Users may access the order book through various means including: clicking on a particular order displayed on the Ticker Tape, entering a symbol in the order book symbol space, or clicking on a symbol being displayed in the market monitor section. Once a user is viewing the Order Book, the user may enter an order, negotiate with an existing order on the book, trade against an order on the book, or execute any of the soft key functions.

| ❶ | ❷ | ❸ | | M❹ | | USD❺ |
|---|---|---|---|---|---|---|
| 21-Aug | X | 0.66 | | 300 | | 104.35 |
| 9:25 | T | 0.68 | | 500 | | 103.875 |
| | | p | 0.65 | | 45 | 104 |
| | | | 0.64 | | 200 | 103.45 |
| | | | | ❻ | vs | ❼ |
| | | | | | 75 | 103.25 |
| | | | 0.64 | | 250 | 103 |
| 9:25 | T | 0.68 | | 500 | | 102.875 |
| 21-Aug | X | 0.66 | | 300 | | 102.56 |

❶ Time or date the order expired or was traded

❷ Key for various pieces of information — X→Expired; T→Traded; A→Accumulated; p→Percent only (no stock); + → Current user's order. N-non negotiable.

❸ Hedge Ratio or Shares see #6

❹ Principal amount of bonds (000's)

❺ Price

❻ Percent Softkey/Shares — Pushing% will change the character from a hedge percentage to a specific # of shares ❼ Price of underlying security on which the view of the order is based. Defaults to an up-tick — Pushing the up button will move the price up by 16ths until the current offer price is reached, pushing the down button will move the price down until the bid is reached. Any price can be input into the field.

Figure 9:
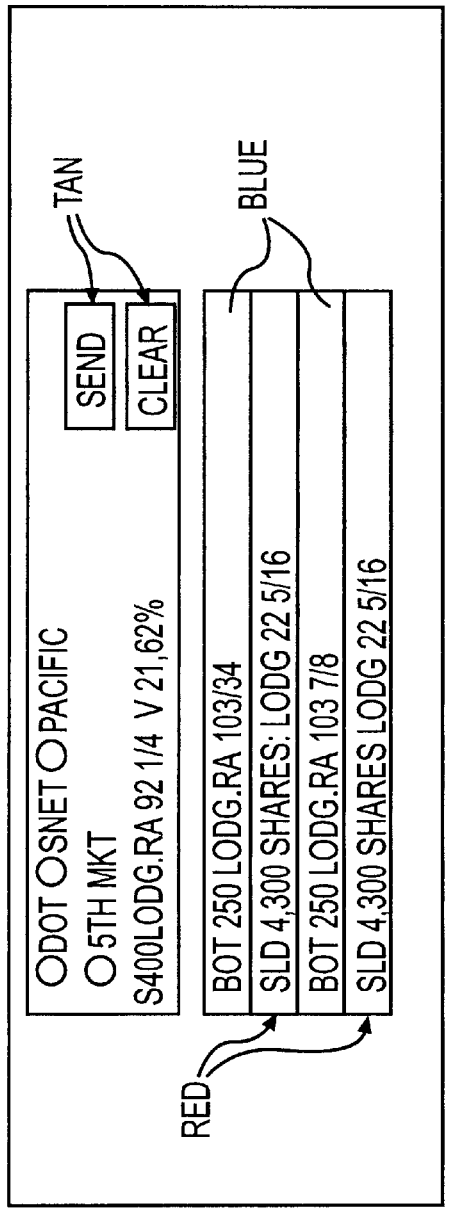
FIG. 9 is a quick-order entry field of the display screen of FIG. 4, which depicts quick-order entries and various trade reports.

FIG. 9—Quick Order Entry/Trade Reports

The quick order entry workspace 108 allows users to enter orders directly into the order book or route orders to an exchange such as NYSE, AMEX or PSE through DOT and ITS or Nasdaq through SelectNet or an ECN.

The quick report display allows users to receive reports on all orders executed. Receipt of information other than via the quick report display will be handled by pop-up messaging and the Order Management System (OMS.)

Figure 10:
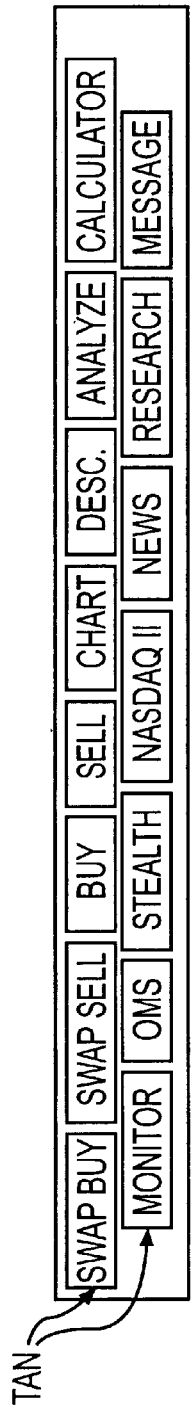
FIG. 10 is the soft-key, wild-card display area of the display screen of FIG. 4.

FIG. 10—Soft Keys For Wild Card Area Display

The Soft Keys 110 located on the workspace 108 allow the user to access various pages, forms, and displays which are then displayed in the Wild Card Workspace. These function keys include:

| | | | |
|---|---|---|---|
| Swap Buy | Conditional buy ticket for entering an order into the System book. | | Pulls up form 1 (a), inserts the security displayed on the order book. |
| Swap Sell | Conditional sell ticket for entering an order into the System book. | | Pulls up form 1 (b), inserts the security displayed on the order book. |
| Buy | Buy ticket for entering an outright order into the System book. | | Pulls up form 1 (c), inserts the security displayed on the order book |
| Sell | Sell ticket for entering an outright order into the System book. | | Pulls up form 1 (d), inserts the security displayed on the order book |
| Chart | Chart of bids, offers, and trades which have occurred in the System over a specified period. | | Pulls up a display of the chart of the item displayed on the order book defaulted to 30 days. |
| Desc. | Gives users descriptive data on approximately 1000 securities. | | Pulls up a display of a description of the security displayed on the order book. |
| Analyze | Allows users to analyze various security types based upon items available in the current database and current prices. | | Pulls up an interactive form defaulted to the security displayed on the order book. The form different for different types of securities (Cvt Bonds, Cvt. Pref., Percs, Decs, Prides, Risk Arb., ADR's, etc.) |
| Calculator | Generally a "dollar neutral" calculator in the beginning. | | Input price and hedge, output new price. |
| Monitor | Allows users to monitor the "top of the book" on approximately 36 securities. | | Activates the Market Monitor section of the workspace. This is the default for the Wild Card Space. |
| OMS | Allows users to enter batch orders, review trade reports, view un-executed and expired orders, adjust prices or quantities and re-enter, and cancel orders. | | Pulls up a list of orders (input by the user) with the stats. (active, expired, remaining, executed. . .) by time. There should be room for a dozen, and there will be some interaction between the OMS and the view of the Book. (e.g. Clicking on an order will pull that security into the book. |
| Stealth | Allows users to monitor various markets for price discrepancies. (not developed yet) Can also be used for internal order management. | | Pulls up an indication input form. |
| NASDAQ | Allows users to view Nasdaq Level II information on any security. | | Pulls up a display of Nasdaq Level II on the security displayed on the order book, or if not a Nasdaq security, then it would pull up a display of the underlying security. |
| Message | Allows users to send and receive messages from system operators. May eventually provide e-mail service and information delivery services. | | Pop-ups for responses; form or input like e-mail. |

Other Softkeys are available on the outskirts of the Workspace. They may include buttons for specific securities, switches for different types of order books (pairs, risk arbitrage, ADR's, or convertible securities), or keys for user default settings, maintenance and communications.

Figure 11:
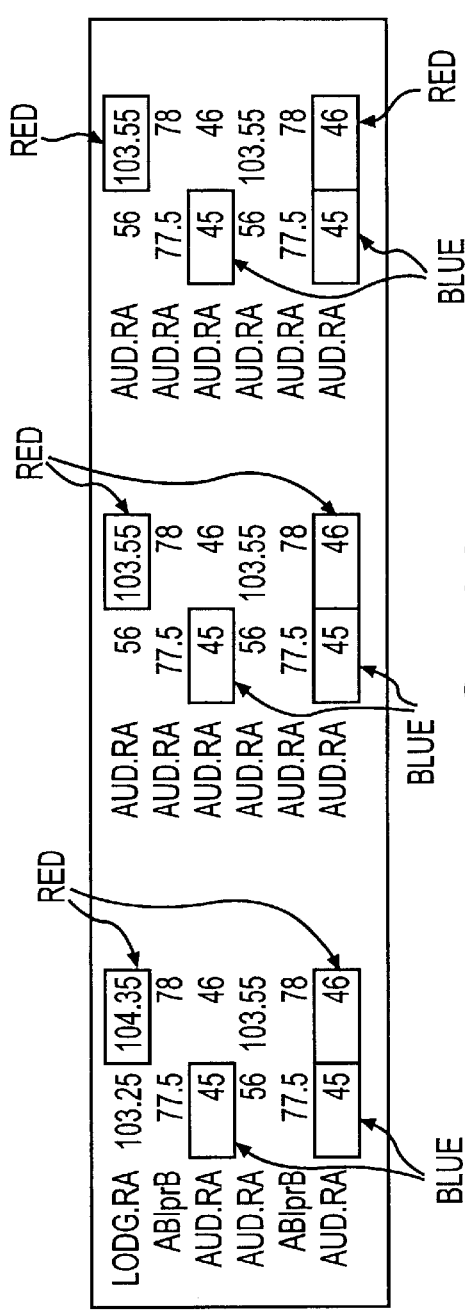
FIG. 11 is the market monitor display field of the display screen of FIG. 4.
Figure 12:
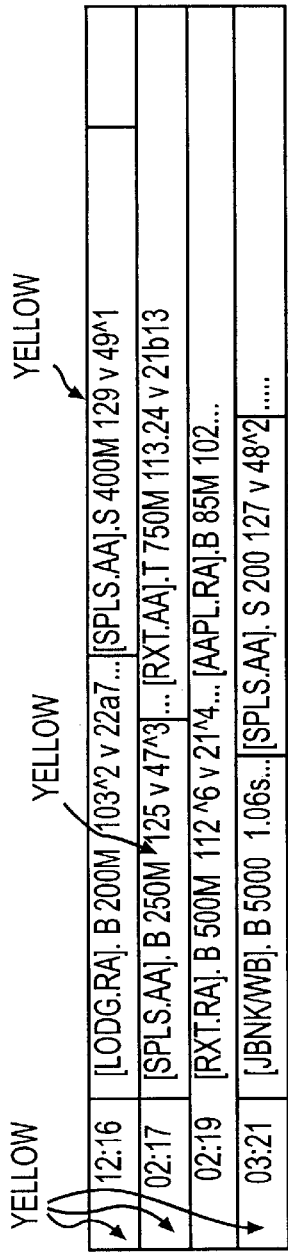
FIG. 12 is an example of a ticker display field on the screen of FIG. 4, with exemplary data thereon.

FIG. 11—Wild Card Workspace

The Market Monitor Screen 112 is the default screen in the Wild Card section of the workspace. The Wild Card section is the area to which all forms default when they are pulled from the soft keys in the Order Book section of the workspace. The Market Monitor Screen 112 is the default or background over which Wild Cards (forms, pop-ups, reports, etc.) make their presence when activated.

The Market Monitor Screen 112 is meant to avail the user of timely and pertinent trading information on several securities in an intuitive manner. This is accomplished by integrating real-time market pricing and a color-coding schema which alerts the user of potential risk and opportunities. It is meant to be viewed in conjunction with the Ticker Tape.

In the above Market Monitor Screen 112, there are three fields of information. The first field is input by the user, and linked to a symbol, probably the same symbol, to the database and pricing mechanism. The second field is the bid side of the market and the third field is the offer side of the market on the security.

White-on-blue fields indicate that the user has the best active bid, and white-on-red fields indicate the user has the best active offer on the book. Blanks indicate no active order on that side of the market. And white-on-black items indicate someone other than that user has the best bid or offer on the book (the best offer and the best bid together are referred to as "the top of the book").

Prices may look different on the Market Monitor, if the user chooses that option, than they do on the book, because the monitor is designed to show either the "top of the book" or the "spread" market. A "spread" market, in this context, means the "top of the book" adjusted for the spread between the bid and ask on the underlying security. For example, a market on the order book showing "102–102½ versus 23¼" (top of the book) may appear as 101.84–102½ (spread), this difference is because the 102–102½ market is a market conditioned on a single stock price while the bid side of the "spread" market is conditioned on the bid for the stock, and the offer side of the "spread" market is conditioned on the offer for the stock. The Market Monitor is designed to display the market both ways. A simple example, depicted in FIGS. 12 to 14, should explain how the various sections of the display screen Workspace interact.

Figure 15:
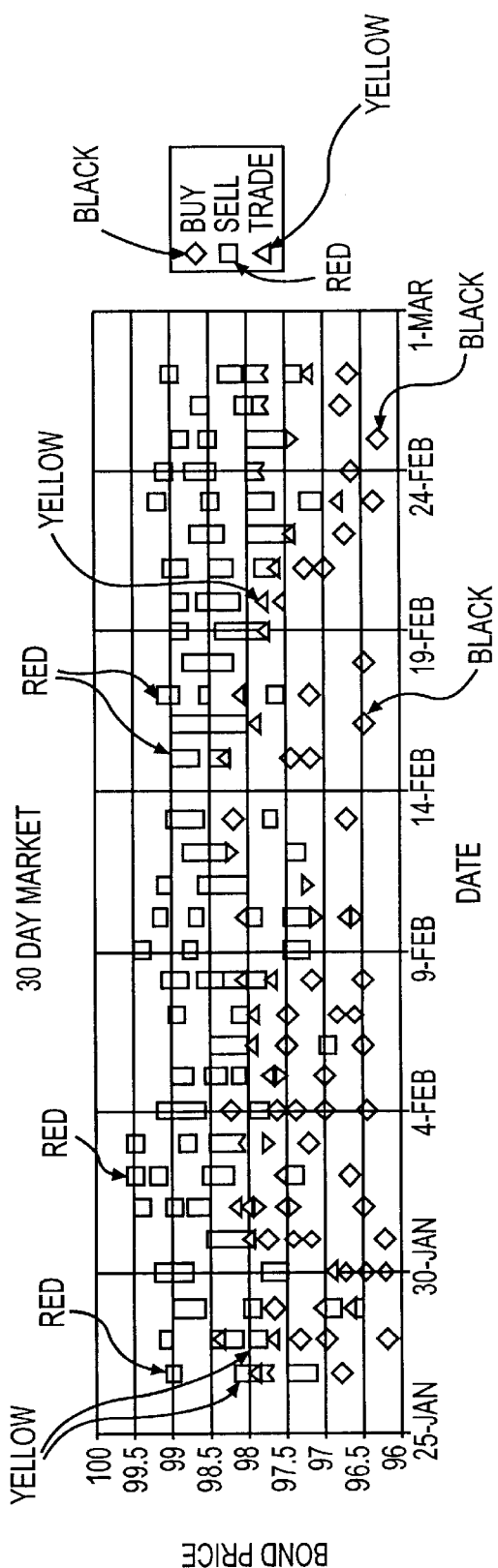
FIG. 15 is a chart representing all of the orders input to the system over a selected 30-day period for example.
Figure 16:
FIG. 16 is an example of a regular convertible bond description form available to users of the system.

The chart in FIG. 15 represents orders put into the system, whether outright or on-swap (conditional orders are sometimes referred to as "on-swap"), and how the price would look had the user executed against that order using the current hedge. The red dots are sell orders, the blue are buy orders and the yellow are trades. This is proprietary data , and can be accessed by all users of the system. The chart is sized to cover only the Wild Card Area of the workspace.

Each datapoint is derived from an original order, for example [LODG.RA].S 250M 109 v 42^2 on Feb. 2, 1997, might be represented on the graph as a point at 98.538 on Feb. 2, 1997 because the stock price when the graph was calculated was 38½ and the user defaulted the hedge ratio to 65% (conversion ratio is 42.92).

datapo int=Bondprice+[(stockpx1−stockpx2)•hedge.ratio•conv.ratio]÷10

$$datapoint \equiv 106 + \left[\left(38\frac{1}{2} - 42\frac{1}{4}\right) \cdot 65 \cdot 42.92\right] \div 10 \equiv 98.538$$

In the preferred embodiment of the present invention, the system sorts and displays the orders on a continuous basis, i.e., when a new order is entered, it is sorted by the client in the order of "best" price given; an underlying security price input, then, as the underlying security price input changes, (this is at least one, and the independent variable in our order's algorithm) the prices of each order (dependent variable) are recalculated and re-sorted.

In other words, when there are two buy orders entered, one which may look like:

Buy 500 IBM 7½% Jan. 1, 2001 at 92, and a second which looks like:

Buy 500 IBM 7½% Jan. 1, 2001 at 91¾ versus selling 10,000 shares of common stock at $35.00

They would be sorted:

| Sort 1 | | |
|---|---|---|
| | | 35 |
| | 500 | 92 |
| 10,000 | 500 | 91¾ |

As the common goes up to $37, the view would change to:

| Sort 1 | | |
|---|---|---|
| | | 37 |
| 10,000 | 500 | 95¾ |
| | 500 | 92 |

The following examples of orders are processable by the system and method of the present invention.

EXAMPLE I

Order

A convertible bond trader wishes to advertise that he would like to purchase 50 ABC bonds at a price of $102 and coincidentally sell 2000 shares of ABC common stock at a price of $19, or the economic equivalent thereof. He is willing to effect this transaction for 30 minutes; he would not like the system to attempt to use other exchanges in its processing; he would like the offer to immediately expire in the event the common stock trades above $21 or below $17 during the life of the order; and he would like the order to be viewed by all of the participants, and he does not wish to execute any part of the trade if the portion executed is less than 25 bonds. The system is anonymous and "live", so the user is not given a choice in these conditions.

The invention, in general, will allow the input and display of these orders, and will execute transactions if all of the conditions to each order are met. The invention will have uses in many different security classes with different conditions having more or less significance to each class, as well as more or less significance to each subscriber. The invention will be of most use to subscribers who purchase and sell convertible securities, corporate bonds, options, futures contracts, and equities (specifically risk arbitrage). An example of an order for each class of security follows.

EXAMPLE II

Corporate Bonds

A corporate bond trader wishes to advertise that he would like to purchase 500M Citicorp 5% Jan. 1, 2001 bonds at a spread to the two-year-treasury of +65 basis points and simultaneously sell 500M of the two-year-treasury; he would like the order to expire in ½ hour; the minimum acceptable amount he is willing to transact is 100M; he is willing to allow the system to interact with other exchanges in its attempt to "fill" the order.

EXAMPLE III

Options

An option trader wishes to enter an order to purchase 10 march X calls on Microsoft at a volatility of 34% and coincidentally sell Y common shares of Microsoft at the price from which the volatility was calculated; where X can be any contract between 100 and 135 and Y is the corresponding "delta" arising from a calculation for that contract and the risk free interest rate defaulted to 6% multiplied by the number of contracts multiplied by a factor of 100 (one contract represents 100 shares); he is willing to execute any combination of contracts fitting this description but is only willing to purchase 10 total; he wants the offer to expire at the end of the day;

This order this is a "willingness matrix" (I'll buy 10 march 100 calls and sell 600 shares or I'll buy 10 march 105 calls and sell 610 shares or I'll buy . . . ) and parts of the matrix are displayed to subscribers as and how they request the data. Subscribers can view the data in a volatility matrix or a price matrix or in the case of reversals and conversions in a ROI/ROE matrix (users input cost of carry, leverage, etc., and the system displays the pricing using the assumptions given to the network by the subscriber, thus each subscriber may contemporaneously view the same order and see quite different volatility prices or ROE/ROI pricing. (i.e. To one subscriber the order may be displayed as a volatility bid of 34% and to another, because of a difference cost-of-carry, the same price bid may be 37%. The system is displaying the same order in a manner which is relevant to that specific user), however, the bid foremost in view does not change the order in which the orders are displayed Futures Contracts (options as well)

A futures trader wishes to purchase 10 may S&P contracts and sell 10 June S&P contracts for a 5-point credit; he is willing to do so for three hours, and is not willing to allow the system to interact with other networks or exchanges to accomplish the task; if the S&P underlying index moves by more than 20 points, he wants the system to kill the order. This is called a spread bid and provides efficiency to the marketplace so that different contract months will each derive some efficiency from efficiencies in other contracts; another example could easily be derived from a grain elevator company with empty elevators where they would contract to purchase grain (in the market) in May, and simultaneously wish to sell the grain in one or more contract months in the future; they would take delivery, store the grain in the elevator, and make delivery later. In this way, the elevator company can create business (there are implied storage costs in the spreads of commodities)

Risk Arbitrage

A risk arbitrage trader wishes to purchase 25,000 shares of Mobil @ $60 and sell-short 20,000 shares of Exxon @ $80; he wishes the order to expire in 10 minutes, he wants to enter the order (and view the order book) from a screen by inputting the ROE bid or ROE offer with the system making the calculation to price from defaults previously input by the user (cost-of-carry, short rebates, expected closing date, delta, expected dividend, etc.); his minimum execution request is 5,000 shares; and he is not willing to allow the system to use other exchanges to attempt to satisfy the request or order.

These different types of orders, which can be placed into the networks can be executed by the system and/or viewed by other subscribers. A table of some of the conditions available for input by subscribers, viewable by other subscribers and executable by the system's trade engine is shown below:

TABLE 1

| Field | Description | Examples |
|---|---|---|
| Type of Order | Buy, Sell, Swap Buy, Swap Sell, Pegged Buy, Pegged Sell: Buy/Sell are fixed price Swap Buy/Sell are variable price and subject to another transaction Pegged Buy/Sell are variable price and variable quantity but not subject to another transaction. | Buy/Sell = Buy 100 IBM for 122 ¼. Swap Buy/Sell = Buy 100 IBM for 122 and Sell 55 ABC at 40 ¼ or the economic equivalent thereof. Pegged Buy/Sell= Buy up to 100 IBM at Y where Y is 122 when the current bid for ABC is 40 ¼ and moves up or down 55 cents per share for each $1 move in the bid price of ABC. |
| Price | Value paid for the security; | 104; or a function having one of the forms in Table 2 |
| Quantity | Maximum Number of securities the subscriber is willing to purchase or sell; | 500,000 principal amount; 20,000 shares; 50 contracts; or a function having one of the forms in Table 3 |
| Minimum Quantity | Minimum number of securities the subscriber is willing to transact in either the first trade or in each trade as the subscriber chooses. | 25,000 principal amount, etc. for each trade; 25,000 principal amount, etc. for the first trade with no minimum being required thereafter. |
| Collar Kill | The order should be cancelled upon an event. The event being the movement of the independent price variable (X) | Cancel the order if the price of XYZ (the secondary security) is above $22/ or below $17 per share. |
| Cap(Floor) | The price, Y, above (below) which the subscriber is not willing to enter into a transaction, It is different than the collar because it relates to the primary security in the transaction and not to | Price = Y = f(x) but not above 105; Price = Y = f(x) but not below 101. The cap will be useful in mitigating the risk of subscribers paying too much in their buy orders, and the floor will be useful in reducing the risk of |

TABLE 1-continued

| Field | Description | Examples |
|---|---|---|
| | the underlying security or "independent variable X" and the order continues in a "live" state (not cancelled) | sellers selling too cheaply. |
| Stealth | The order is not viewable by any other subscribers, but the trade engine should execute a transaction if the conditions are met. | Buy up to 500,000 principal amount of XYZ at Y (where Y is a function) in the event someone independently enters a sell order at a price which is at or below Y and all other conditions are no, but don't allow subscribers to view the order |

TABLE 2

| | |
|---|---|
| Convertible Bond Function | $Y = f(x) = (X-PX1) * H\% * CR / F + PY1$, where X is the current price of the underlying security PX1 was the price of the underlying security input by the subscriber as a reference price to the price (PY1) he was willing to pay for the Bond. H % is the hedge ratio as a percentage, is applied to the Conversion Ratio CR, and is divided by a pricing factor F, which in most cases is 10 for domestic convertible bonds and 1 for convertible preferred stock. Thus, if the price of the common (X-PX1) moves by 25 cents per share and the conversion ratio is 40 shares per bond, the price Y will move up ½ point from the original price of PY1 if the Hedge Ratio as input by the subscriber entering the order is 50%. The factor of 10 is the conversion of $5.00 (($.25/share)*.5*40 share/bond) to ½ of 1% of the face amount (face amount = $1,000). Prices are generally quoted in percent. IOW, a price of 102 would be $1020.00/bond. |
| Straight Bonds (1 currency) | |
| Warrants | |
| Options (Black & Schoels) | |
| Options (Binomial) | |
| Risk Arbitrage General Form | |
| Straight Bonds (2 currency) | |

What is claimed is:

1. A conditional order transaction network that matches or compares buy and sell orders for a plurality of security instruments based upon conditions set forth within the order, including price represented as an algorithm with constraints thereon, the transaction network comprising:

a variable number of trader terminals for entering an order for a security instrument in the form of an algorithm with constraints thereon that represent a willingness to transact, where price of one security is a dependent variable of the algorithm within the constraints and dynamically changing price of another security is an independent variable thereof, the price as the dependent variable being continuously changeable responsive to changes in price of the independent variable, the algorithm representing a buy or sell order; and at least one controller computer coupled to each of the trader terminals over a communications network and receiving as inputs,
  a) each algorithm with its corresponding constraints and
  b) at least one external price feed depicting prices of various securities and contracts from external multiple exchanges which may be used as an independent variable of the algorithm or an input to a constraint variable, the controller computer comprising,
    means for matching, in accordance with the constraints and conditions, algorithmic buy orders with algorithmic sell orders, one of the conditions being the requirement that two or more securities are tradable contemporaneously as a contingent trade of those respective securities, and
    means for matching or comparing, in accordance with the constraints and conditions, algorithmic buy/sell orders with algorithmic or non-algorithmic sell/buy orders through the use of the external multiple data sources.

2. The conditional order transaction network of claim 1 wherein the order price, as represented in the form of an algorithm, includes an order quantity subject to another algorithm.

3. The conditional order transaction network of claim 2 wherein the price may be a yield.

4. The conditional order transaction network of claim 2 wherein the price may be a volatility.

5. The conditional order transaction network of claim 2 wherein the price may be a yield spread.

6. The conditional order transaction network of claim 1 wherein the controller computer matches/compares orders in real-time as each order is received at the controller computer and as each new price of each other underlying security is received at the controller computer.

7. The conditional order transaction network of claim 1 further comprising means for maintaining the identity of the terminal on which the order was entered.

8. The conditional order transaction network of claim 1 wherein the order algorithm can be represented as a line in two dimensional space with constraints having the price of one security as one axis and the price of another security as its other axis.

9. The conditional order transaction network of claim 1 wherein the instrument includes bonds.

10. The conditional order transaction network of claim 1 wherein the instrument includes warrants.

11. The conditional order transaction network of claim 1 wherein the independent variable may include multiple independent variables.

12. The conditional order transaction network of claim 1 wherein the sell order includes a sell short order.

13. The conditional order transaction network of claim 1 wherein the instrument includes convertible securities.

14. The conditional order transaction network of claim 1 wherein the instrument includes stocks.

15. The conditional order transaction network of claim 1 wherein the instrument includes options.

16. The conditional order transaction network of claim 1 wherein the instrument includes futures.

17. The conditional order transaction network of claim 1 wherein the instrument includes forward contracts.

18. The conditional order transaction network of claim 1 wherein the instrument includes swap contracts.

19. The conditional order transaction network of claim 1 wherein one of the conditions is that no transaction can occur when the independent variable price is above or below set limits.

20. The conditional order transaction network of claim 1 wherein one of the conditions is that the price is not to exceed a specified level regardless of the results produced by the algorithm.

21. The conditional order transaction network of claim 1 wherein one of the conditions is that the price is not to be less than a specified level regardless of the results produced by the algorithm.

22. The conditional order transaction network of claim 1 wherein one of the conditions is the requirement that the orders be matched/compared without use of prices fed from said external multiple exchanges.

23. The conditional order transaction network of claim 1, further including a plurality of trader workstations for trading and negotiating prospective trades for instruments referenced in buy and sell orders, based upon conditions set forth in the orders including price represented by an algorithm with constraints thereon, each workstation comprising;
  a display device for displaying the selected parameters of buy and sell orders in a prioritized sequence in a descending order of favorability across a display field, with the most favorable order at one distal end and the least favorable at the other distal end;
  an input device for entering outgoing orders to be traded or negotiated into the trader workstation; and
  a computer for receiving the outgoing orders and incoming order information from traders' terminals, and for controlling the display device, said computer including,
    a comparator for comparing all incoming orders relative to outgoing orders, and
    a sorter that resequences the orders in real-time in the display field as each order is received to reflect changes in the relative favorability of the orders responsive to changes in price of said another item as the independent variable.

24. A trader workstation for trading and negotiating prospective trades for securities referenced in buy and sell orders, based upon conditions set forth in the orders including price represented by an algorithm with constraints thereon, said algorithm representing a willingness to transact wherein price is a dependent variable of the algorithm and dynamically changing price of another security is an independent variable, the price as the dependent variable being continuously changeable responsive to changes in price of the independent variable, comprising;
  a display device for displaying the selected parameters of buy and sell orders in a prioritized sequence in a descending order of favorability across a display field, with the most favorable order at one distal end and the least favorable at the other distal end;
  an input device for entering outgoing orders to be traded or negotiated into the trader workstation; and
  a computer for receiving the outgoing orders and incoming order information from traders' terminals, and for controlling the display device, said computer including,
    a comparator for comparing all incoming orders relative to outgoing orders, and
    a sorter that resequences the orders in real-time in the display field as each order is received to reflect changes in the relative favorability of the orders responsive to dynamic changes in price of said another security as the independent variable.

25. The workstation of claim 24 wherein the order price, as represented by an algorithm, includes an order quantity subject to another algorithm.

26. The workstation of claim 25 wherein price may be a yield.

27. The workstation of claim 25 wherein price may be a volatility.

28. The workstation of claim 25 wherein price may be a yield spread.

29. The workstation of claim 24 wherein the computer matches/compares orders in real-time as each order is received at the computer and as each new price of each other conditional security is received at the computer.

30. The workstation of claim 24 further comprising means for maintaining the identity of the trader's terminal on which the order was entered.

31. The workstation of claim 24 wherein the order algorithm can be represented as a line in two-dimensional space with constraints having price of one security as one axis and price of another security as its other axis.

32. The workstation of claim 24 wherein the sell order includes a sell short order.

33. The workstation of claim 24 wherein the instrument includes convertible securities.

34. The workstation of claim 24 wherein the instrument includes stocks.

35. The workstation of claim 24 wherein the instrument includes options.

36. The workstation of claim 24 wherein the instrument includes futures.

37. The workstation of claim 24 wherein the instrument includes forward contracts.

38. The workstation of claim 24 wherein the instrument includes swap contracts.

39. The workstation of claim 24 wherein the relative favorability is determined by the current value of the underlying security.

40. The workstation of claim 24 wherein said display device further includes a ticker field, for displaying changing security values from external markets, an order entry field, for displaying current order information of the algorithms to be negotiated/traded, and a wild card field, for displaying research data related to the algorithms.

41. A conditional order transaction network that matches or compares buy and sell orders for a plurality of items based upon conditions set forth within the order, including price represented as an algorithm with constraints thereon, the conditional order transaction network comprising:
a variable number of trader terminals for entering an order for an item in the form of an algorithm with constraints thereon that represent a willingness to transact, where price of one item is a dependent variable of the algorithm within the constraints and dynamically changing price of another item is an independent variable thereof, the price as the dependent variable being continuously changeable responsive to changes in price of the independent variable, the algorithm representing a buy or sell order; and
controller computer means coupled to each of the trader terminals over a communications network and receiving as inputs, each algorithm with its corresponding constraints; and
means for matching, in accordance with the constraints and conditions, algorithmic or non-algorithmic buy orders with algorithmic or non-algorithmic sell orders, one of the conditions being the requirement that two or more securities are tradable contemporaneously as a contingent trade of those respective securities responsive to changes in price of said another item as the independent variable.

42. The conditional order transaction network of claim 41, further including a plurality of trader workstations for trading and negotiating prospective trades for instruments referenced in buy and sell orders, based upon conditions set forth in the orders including price represented by an algorithm with constraints thereon, each workstation comprising;
a display device for displaying the selected parameters of buy and sell orders in a prioritized sequence in a descending order of favorability across a display field, with the most favorable order at one distal end and the least favorable at the other distal end;
an input device for entering outgoing orders to be traded or negotiated into the trader workstation; and
a computer for receiving the outgoing orders and incoming order information from traders' terminals, and for controlling the display device, said computer including,
a comparator for comparing all incoming orders relative to outgoing orders, and
a sorter that resequences the orders in real-time in the display field as each order is received to reflect changes in the relative favorability of the orders responsive to changes in price of said another item as the independent variable.

43. A conditional order transaction network that electronically matches or compares buy and sell orders for a plurality of items from the same or diverse markets based upon conditions set forth within the order, including the represented as an algorithm with constraints thereon, the conditional order transaction network comprising:
a variable number of trader terminals for entering an order for an item in the form of an algorithm with constraints thereon that represent a willingness to transact, where dynamically changing price is the dependent variable of the algorithm within the constraints and price of another item as an independent variable, the price as the dependent variable being continuously changeable responsive to changes in price of the independent variable, the algorithm representing a buy or sell order; and
controller computer means coupled to each of the trader terminals over a communications network and receiving as inputs, each algorithm with its corresponding constraints;
means for matching, in accordance with the constraints and conditions, algorithmic or non-algorithmic buy orders with algorithmic or non-algorithmic sell orders, one of the conditions being the requirement that two or more items are tradable contemporaneously as a contingent trade of those respective items; and
simultaneously executing a trade of said items in the same or diverse markets as a single electronically matched trade responsive to dynamic changes in price of said another item as the independent variable.

* * * * *

(12) EX PARTE REEXAMINATION CERTIFICATE (9519th)
United States Patent
Nieboer et al.

(10) Number: US 6,418,419 C1
(45) Certificate Issued: Feb. 21, 2013

(54) AUTOMATED SYSTEM FOR CONDITIONAL ORDER TRANSACTIONS IN SECURITIES OR OTHER ITEMS IN COMMERCE

(75) Inventors: Robert Scott Nieboer, Nashville, TN (US); Pedro V. Balcarce, Antioch, TN (US); Ivan N. Zhidov, Nashville, TN (US); Micah James Eldred, Nashville, TN (US)

(73) Assignee: 5th Market, Inc., Nashville, TN (US)

Reexamination Request:
No. 90/011,603, Mar. 28, 2011
No. 90/011,618, Apr. 29, 2011

Reexamination Certificate for:
Patent No.: 6,418,419
Issued: Jul. 9, 2002
Appl. No.: 09/359,686
Filed: Jul. 23, 1999

(51) Int. Cl.
*G06F 17/60* (2006.01)

(52) U.S. Cl. .......................................................... 705/37
(58) Field of Classification Search .................. 705/37
See application file for complete search history.

(56) References Cited

To view the complete listing of prior art documents cited during the proceedings for Reexamination Control Numbers 90/011,603 and 90/011,618, please refer to the USPTO's public Patent Application Information Retrieval (PAIR) system under the Display References tab.

*Primary Examiner* — Jeffrey D. Carlson

(57) ABSTRACT

An apparatus and method of automatically and anonymously buying and selling positions in fungible properties between subscribers. The specific embodiment described in the disclosure relates to the buying and selling of securities or contracts where the offer to purchase or sell the property may be conditioned upon factors such as the ability to purchase or sell other property or the actual purchase or sale of other property. Specifically, the system described includes methods by which the system will sort and display the information available on each order, methods by which the system will match buy and sell order and attempt to use other markets to effect the execution of transactions without violating conditions set by the subscriber, methods by which the apparatus will execute transaction and report prices to third parties such that the user is satisfied and short sales are reported as prescribed by the rules and regulations of the appropriate regulatory body governing each subscriber in the associated transaction. A communication system is described which allows subscribers to communicate anonymously for the purpose of effecting transactions in such property under such conditions.

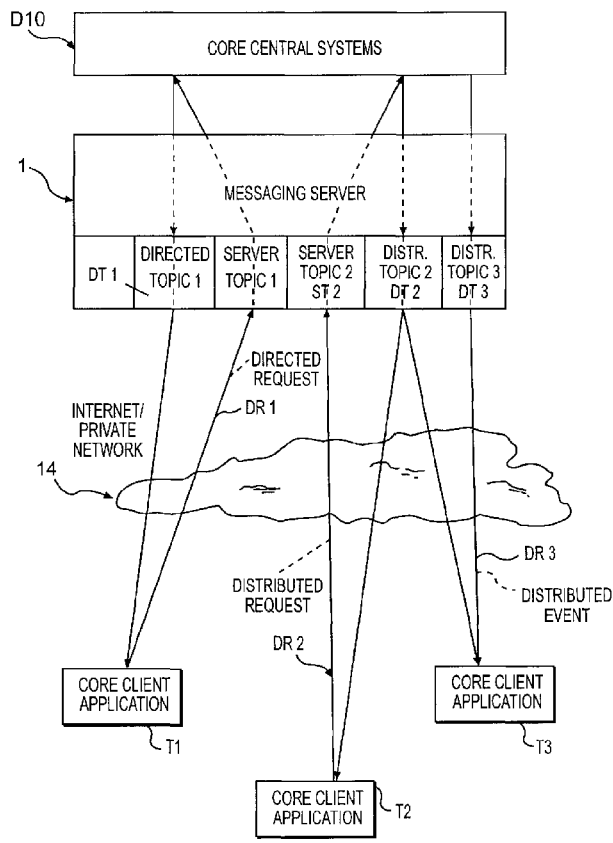

US 6,418,419 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 24-40 are cancelled.

Claims 1-5, 7-11, 13-18, 23 and 41-43 are determined to be patentable as amended.

Claims 6, 12, 19-22, dependent on an amended claim, are determined to be patentable.

New claims 44-49 are added and determined to be patentable.

1. A conditional order transaction network that matches or compares buy and sell orders for a plurality of security instruments based upon conditions set forth within the order, including price represented as an algorithm with constraints thereon, the transaction network comprising:
   a variable number of trader terminals for entering an order for a security instrument in [the] *a* form of an algorithm with constraints thereon that represent a willingness to transact, where price of one security is a dependent variable of the algorithm within the constraints and dynamically changing price of another security is an independent variable thereof, the price as the dependent variable being continuously changeable responsive to changes in price of the independent variable, the algorithm representing a buy or sell order; and
   at least one controller computer coupled to each of the *variable number of* trader terminals over a communications network and receiving as inputs,
   a) each algorithm with its corresponding constraints, and
   b) at least one external price feed depicting prices of various securities and contracts from external multiple exchanges which may be used as an independent variable of the algorithm or an input to a constraint variable, the controller computer comprising,
      means for matching, in accordance with the constraints and *the* conditions, algorithmic buy orders with algorithmic sell orders, one of the conditions being [the] *a* requirement that two or more securities are tradable contemporaneously as a contingent trade of those respective securities, and
      means for matching or comparing, in accordance with the constraints and *the* conditions, algorithmic buy/sell orders with algorithmic or non-algorithmic sell/buy orders through [the] use of the external multiple data sources.

2. The conditional order transaction network of claim 1 wherein the [order] price, as represented in the form of [an] *the* algorithm, includes an order quantity subject to another algorithm.

3. The conditional order transaction network of claim 2 wherein the price [may be] *is* a yield.

4. The conditional order transaction network of claim 2 wherein the price [may be] *is* a volatility.

5. The conditional order transaction network of claim 2 wherein the price [may be] *is* a yield spread.

7. The conditional order transaction network of claim 1 further comprising means for maintaining [the] identity of [the] *a trader* terminal on which the order was entered.

8. The conditional order transaction network of claim 1 wherein the [order] algorithm *of the order* can be represented as a line in two dimensional space with constraints having the price of one security as one axis and the price of another security as its other axis.

9. The conditional order transaction network of claim 1 wherein the *security* instrument *for which the order is entered* includes bonds.

10. The conditional order transaction network of claim 1 wherein the *security* instrument *for which the order is entered* includes warrants.

11. The conditional order transaction network of claim 1 wherein the independent variable [may include] *includes* multiple independent variables.

13. The conditional order transaction network of claim 1 wherein the *security* instrument *for which the order is entered* includes convertible securities.

14. The conditional order transaction network of claim 1 wherein the *security* instrument *for which the order is entered* includes stocks.

15. The conditional order transaction network of claim 1 wherein the *security* instrument *for which the order is entered* includes options.

16. The conditional order transaction network of claim 1 wherein the *security* instrument *for which the order is entered* includes futures.

17. The conditional order transaction network of claim 1 wherein the *security* instrument *for which the order is entered* includes forward contracts.

18. The conditional order transaction network of claim 1 wherein the *security* instrument *for which the order is entered* includes swap contracts.

23. The conditional order transaction network of claim 1, further [including] *comprising:*
   a plurality of trader workstations for trading and negotiating prospective trades for *the security* instruments referenced in *the* buy and sell orders, based upon conditions set forth in the *buy and sell* orders including price represented by an algorithm with constraints thereon, each trader workstation *of the plurality of trader workstations* comprising[;] *:*
   a display device for displaying [the] selected parameters of buy and sell orders in a prioritized sequence in a descending order of favorability across a display field, with [the] *a* most favorable order at one distal end and [the] *a* least favorable *order* at the other distal end;
   an input device for entering outgoing orders to be traded or negotiated into the trader workstation; and
   a computer for receiving the outgoing orders and incoming order information from [traders'] *the trader* terminals, and for controlling the display device, said computer including[,]
      a comparator for comparing all incoming orders relative to outgoing orders, and
      a sorter that resequences the orders in real-time in the display field as each order is received to reflect changes in [the] relative favorability of the orders responsive to changes in price of said another [item] *security* as the independent variable.

41. A conditional order transaction network that matches [or compares] buy and sell orders for a plurality of items based upon conditions set forth within [the] *an* order *for an item*, including price represented as an algorithm with constraints thereon, the conditional order transaction network comprising:
 a variable number of trader terminals for entering [an] *the* order for [an] *a traded* item *being an option* in [the] *a* form of an algorithm with constraints thereon that represent a willingness to transact, where price of [one] *the traded* item is a dependent variable of the algorithm within the constraints and dynamically changing price of another item is an independent variable thereof, the price *of the traded item* as the dependent variable being continuously changeable responsive to changes in price of the *another item as the* independent variable, the algorithm representing a buy or sell order *for said traded item*; [and]
 controller computer means coupled to each of the *variable number of* trader terminals over a communications network and receiving as inputs[,] each algorithm with its corresponding constraints, *and at least one external price feed depicting at least one price of at least one item from at least one external network which is used as either the independent variable of the algorithm or an input to a constraint variable*; and
 means for matching, in accordance with the constraints and *the* conditions, *through use of the at least one external price feed from the at least one external network*, at least one *of* algorithmic or non-algorithmic buy orders with algorithmic [or non-algorithmic] sell orders, *and non-algorithmic buy orders with algorithmic sell orders*, one of the conditions being [the] *a* requirement that two or more securities are tradable contemporaneously as a contingent trade of those respective securities responsive to changes in price of said another item as the independent variable.

42. The conditional order transaction network of claim 41, further [including] *comprising:* a plurality of trader workstations for trading and negotiating prospective trades for instruments referenced in *the* orders, based upon *the* conditions set forth in the orders including price represented by an algorithm with constraints thereon, each *trader* workstation [comprising:] *of the plurality of trader workstations including*
 a display device for displaying [the] selected parameters of *the* buy and sell orders in a prioritized sequence in a descending order of favorability across a display field, with [the] *a* most favorable order at one distal end and [the] *a* least favorable at the other distal end;
 an input device for entering outgoing orders to be traded or negotiated into the trader workstation; and
 a computer for receiving the outgoing orders and incoming order information from [traders'] *the trader* terminals, and for controlling the display device, said computer including,
  a comparator for comparing all incoming orders relative to outgoing orders, and
  a sorter that resequences the orders in real-time in the display field as each order is received to reflect changes in [the] relative favorability of the orders responsive to changes in price of said another item as the independent variable.

43. A conditional order transaction network that electronically matches [or compares] buy and sell orders for a plurality of items from [the] *a* same [or] *market and a* diverse [markets] *market* based upon conditions set forth within [the] *an* order *for an item of the plurality of items*, including [the] *price* represented as an algorithm with constraints thereon, the conditional order transaction network comprising:
 a variable number of trader terminals for entering [an] *the* order for [an] *the* item in [the] *a* form of an algorithm with constraints thereon that represent a willingness to transact, where dynamically changing price is [the] *a* dependent variable of the algorithm within the constraints and price of another item [as] *is* an independent variable, the price as the dependent variable being continuously changeable responsive to changes in price of the *another item as the* independent variable, the algorithm representing a buy or sell order; [and]
 controller computer means coupled to each of the *variable number of* trader terminals over a communications network and receiving as inputs, each algorithm with its corresponding constraints, *and at least one external price feed of at least one item from said diverse market which is used as either the independent variable of the algorithm or an input to a constraint variable;*
 means for matching, in accordance with the constraints and *the* conditions, *through use of said at least one external price feed from said diverse market*, at least one *of* algorithmic [or non-algorithmic] buy orders with algorithmic or non-algorithmic sell orders, *and non-algorithmic buy orders with algorithmic sell orders,* one of the conditions being [the] *a* requirement that two or more items are tradable contemporaneously as a contingent trade of those respective items[;] *,* and
 simultaneously executing a trade of said items in the same [or] *and* diverse markets as a single electronically matched trade responsive to dynamic changes in price of said another item as the independent variable.

*44. The conditional order transaction network according to claim 1, wherein*
 *the conditional order transaction network matches buy and sell orders for the plurality of security instruments, and*
 *at least one price depicted by the at least one external price feed is used as the independent variable of the algorithm.*

*45. The conditional order transaction network according to claim 1, wherein*
 *at least one price depicted by the at least one external price feed is used as the input to the constraint variable.*

*46. The conditional order transaction network according to claim 41, wherein*
 *the conditional order transaction network matches buy and sell orders for the plurality of items, and*
 *at least one price depicted by the at least one external price feed is used as the independent variable of the algorithm.*

*47. The conditional order transaction network according to claim 41, wherein*
 *at least one price depicted by the at least one external price feed is used as the input to the constraint variable.*

*48. The conditional order transaction network according to claim 43, wherein*
 *at least one price depicted by the at least one external price feed is used as the independent variable of the algorithm.*

*49. The conditional order transaction network according to claim 43, wherein*
 *at least one price depicted by the at least one external price feed is used as the input to the constraint variable.*

\* \* \* \* \*